United States Patent
Mishra et al.

(10) Patent No.: US 12,143,291 B2
(45) Date of Patent: Nov. 12, 2024

(54) ON-DEMAND HARDWARE RESOURCE ALLOCATION TO DEBUG MULTICAST NETWORK AT HIGH SCALE

(71) Applicant: Cisco Technology, Inc., San Jose, CA (US)

(72) Inventors: Mankamana Mishra, San Jose, CA (US); Nitin Kumar, San Jose, CA (US); Sridhar Santhanam, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 119 days.

(21) Appl. No.: 17/900,340

(22) Filed: Aug. 31, 2022

(65) Prior Publication Data

US 2024/0073122 A1 Feb. 29, 2024

(51) Int. Cl.
- *G06F 15/173* (2006.01)
- *H04L 43/026* (2022.01)
- *H04L 43/04* (2022.01)
- *H04L 45/16* (2022.01)

(52) U.S. Cl.
CPC ............ *H04L 45/16* (2013.01); *H04L 43/026* (2013.01); *H04L 43/04* (2013.01)

(58) Field of Classification Search
CPC .............................. H04L 43/04; H04L 43/026
See application file for complete search history.

(56) References Cited

U.S. PATENT DOCUMENTS

| 10,747,645 | B2 * | 8/2020 | Myers .................. G06F 11/3636 |
| 2005/0129017 | A1 * | 6/2005 | Guingo .................... H04L 41/12 370/390 |
| 2012/0033667 | A1 | 2/2012 | Venkataraman et al. |
| 2012/0120954 | A1 | 5/2012 | Mentze et al. |
| 2015/0222510 | A1 * | 8/2015 | Vaidya .................... H04L 43/10 370/242 |
| 2018/0375740 | A1 * | 12/2018 | Chen ....................... H04L 49/90 |
| 2020/0344155 | A1 | 10/2020 | Chhibber et al. |

OTHER PUBLICATIONS

ETSI, "Digital cellular telecommunications system (Phase 2+); Universal Mobile Telecommunications System (UMTS); Telecommunication management; Subscriber and equipment trace; Trace control and configuration management '3GPP TS 32.422 version 8.4.0 Release 8)", ETSI TS 132 422 V8.4.0, Apr. 2009, 80 pages.

(Continued)

*Primary Examiner* — Yves Dalencourt
(74) *Attorney, Agent, or Firm* — Edell, Shapiro & Finnan, LLC

(57) ABSTRACT

A method is performed at a router on a multicast configured to forward a multicast flow. The method comprises: in response to receiving, from a controller connected to the multicast path or the multicast path, an enable command to enable statistics tracing for the multicast flow, determining whether the router has sufficient resources to perform statistics tracing; and when the router has the sufficient resources: responsive to the enable command, enabling statistics tracing to collect statistics for the multicast flow; generating a first request to include the enable command and the statistics; and forwarding the first request towards the controller.

20 Claims, 6 Drawing Sheets

(56) References Cited

OTHER PUBLICATIONS

H. Asaeda et al., "Mtrace Version 2: Traceroute Facility for IP Multicast", Internet Engineering Task Force (IETF), Request for Comments: 8487, Category: Standards Track, ISSN: 2070-1721, Oct. 2018, 41 pages.

Cisco, "Implementing Layer-3 Multicast Routing", downloaded Aug. 22, 2022, 32 pages.

* cited by examiner

ON-DEMAND HARDWARE RESOURCE ALLOCATION TO DEBUG MULTICAST NETWORK AT HIGH SCALE

TECHNICAL FIELD

The present disclosure relates generally to tracing multicast flows in a network.

BACKGROUND

Enterprise customers and service providers that operate multicast networks face a growing challenge when monitoring and debugging the multicast networks on a large scale, given that such networks can carry hundreds of thousands or even millions of multicast flows at any given time. An existing Internet Protocol (IP) multicast traceroute (Mtrace) facility, Mtrace version 2 (V2) (Mtrace V2 or "Mtrace2") defined in LEFT RFC 8487, defines a basic, limited, multicast tracing framework implemented primarily on routers. A constraint limiting the effectiveness of Mtrace2 is that the routers have limited local resources available to support the multicast tracing. That is, the routers may not have sufficient resources to employ multicast tracing for all multicast flows all of the time.

DETAILED DESCRIPTION

Overview

In an embodiment, a method is performed at a router on a multicast path configured to forward a multicast flow. The method comprises: upon receiving, from a controller connected to the multicast path or the multicast path, an enable command to enable statistics tracing for the multicast flow, determining whether the router has sufficient resources to perform statistics tracing; and when the router has the sufficient resources: responsive to the enable command, enabling statistics tracing to collect statistics for the multicast flow; generating a first request to include the enable command and the statistics; and forwarding the first request towards the controller.

Example Embodiments

Embodiments presented control the allocation of resources of a router to multicast tracing for a multicast flow in a manner that avoids exhaustion of the resources by other multicast flows. That is, the embodiments help ensure that the router has sufficient multicast tracing resources to perform the multicast tracing for the multicast flow in the face of other multicast flows that would otherwise exhaust the resources. The embodiments also provide visibility in the form of feedback status into whether the router has sufficient resources for the multicast tracing. In a non-limiting example, the embodiments modify or extend Mtrac2 to include new features and functionality to provide the aforementioned control and visibility. Once a multicast trace (also referred to as "multicast tracing") is initiated for a multicast flow, the multicast tracing collects various data/statistics for the multicast flow from each router traversed by the multicast flow. Accordingly, in the ensuing description, "multicast tracing" is referred to as "multicast statistic tracing" or simply "statistics tracing."

Figure 1:
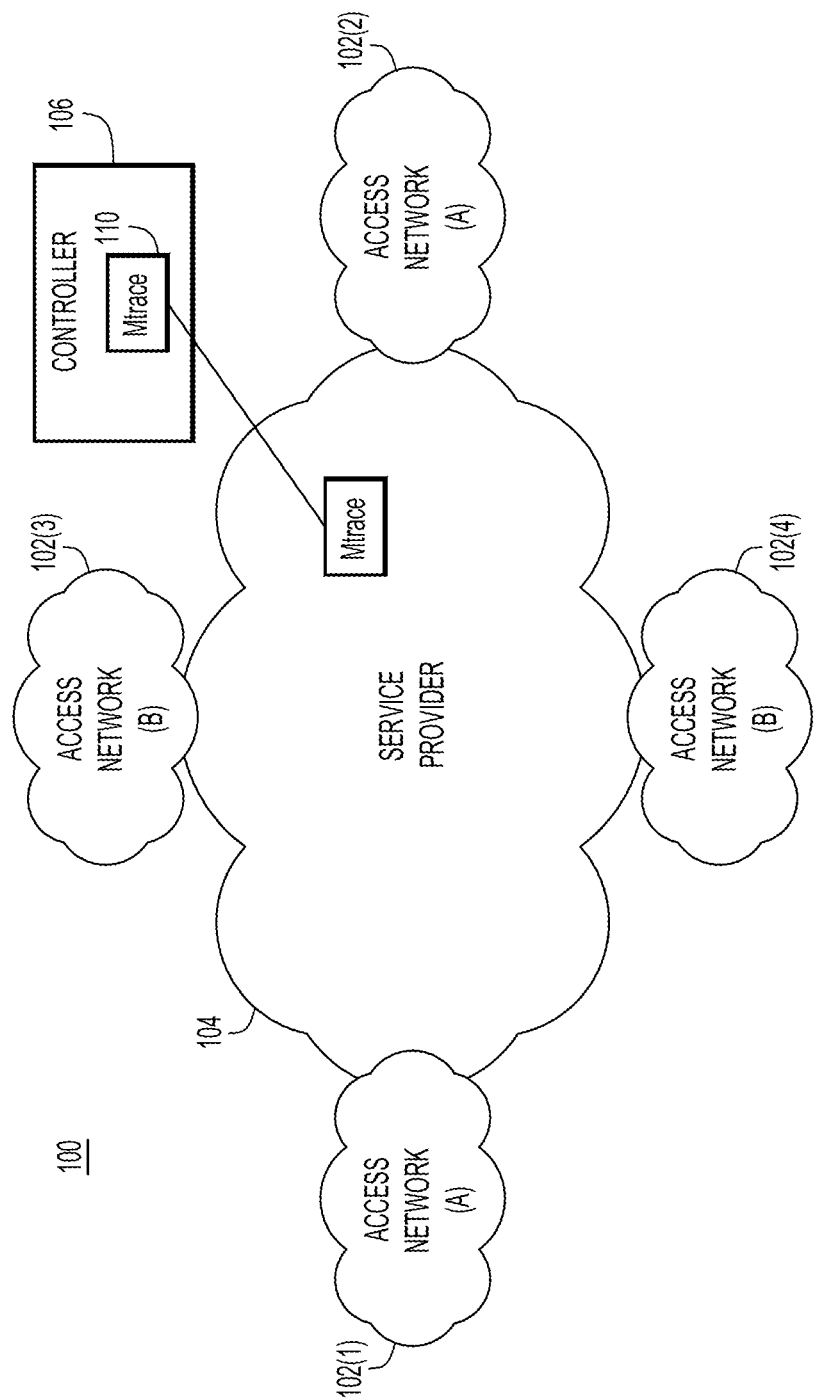
FIG. 1 is a block diagram of a network environment in which embodiments directed to controlling statistics tracing for a multicast flow may be implemented, according to an example embodiment.

Referring to FIG. 1, there is a block diagram of an example network environment 100 in which embodiments directed to controlling statistics ("stats") tracing for a multicast flow may be implemented. Network environment 100 includes enterprise/customer operated access networks 102(1)-102(4) (collectively referred to as access networks 102) and a service provider (SP) network 104 connected to the access networks. SP network 104 provides access networks 102 with access to each other and other networks, not specifically shown. An enterprise A operates access networks 102(1) and 102(2), and an enterprise B operates access networks 102(3) and 102(4). Access networks 102 and SP network 104 may include, and/or be connected to, local area networks (LANs) and/or wide area networks (WANs), such as the Internet. Access networks 102 communicate with each other through SP network 104, for example. That is, access networks 102 send traffic to each other using SP network 104. In an example, client/customer equipment connected to access networks 102 originate multicast traffic (e.g., flows of IP multicast packets) and SP network 104 forwards the multicast traffic (also referred to as "multicast flows") between the access networks.

Network environment 100 further includes a control entity or controller 106 connected to one or more of access networks 102 and SP network 104. Through controller 106, a network operator may control network nodes (not shown in FIG. 1) of access networks 102 and SP network 104 to control statistics tracing of multicast flows across the networks. To this end, controller 106, access networks 102, and SP network 104 (i.e., the network nodes of the networks) collectively implement a multicast traceroute application (Mtrace) 110 configured to control the statistics tracing of the multicast flows, in accordance with embodiments presented herein. More specifically, controller 106 and the network nodes of access networks 102 and/or SP network 104 host respective components of Mtrace 110 in order to implement its functionality. In an example, Mtrace 110 expands or modifies the basic functionality of Mtrace2 to include additional features presented herein. In other examples, Mtrace 110 may be implemented based on multicast tracing approaches that are not related to Mtrace2, i.e., that are independent of Mtrace2.

Figure 2:
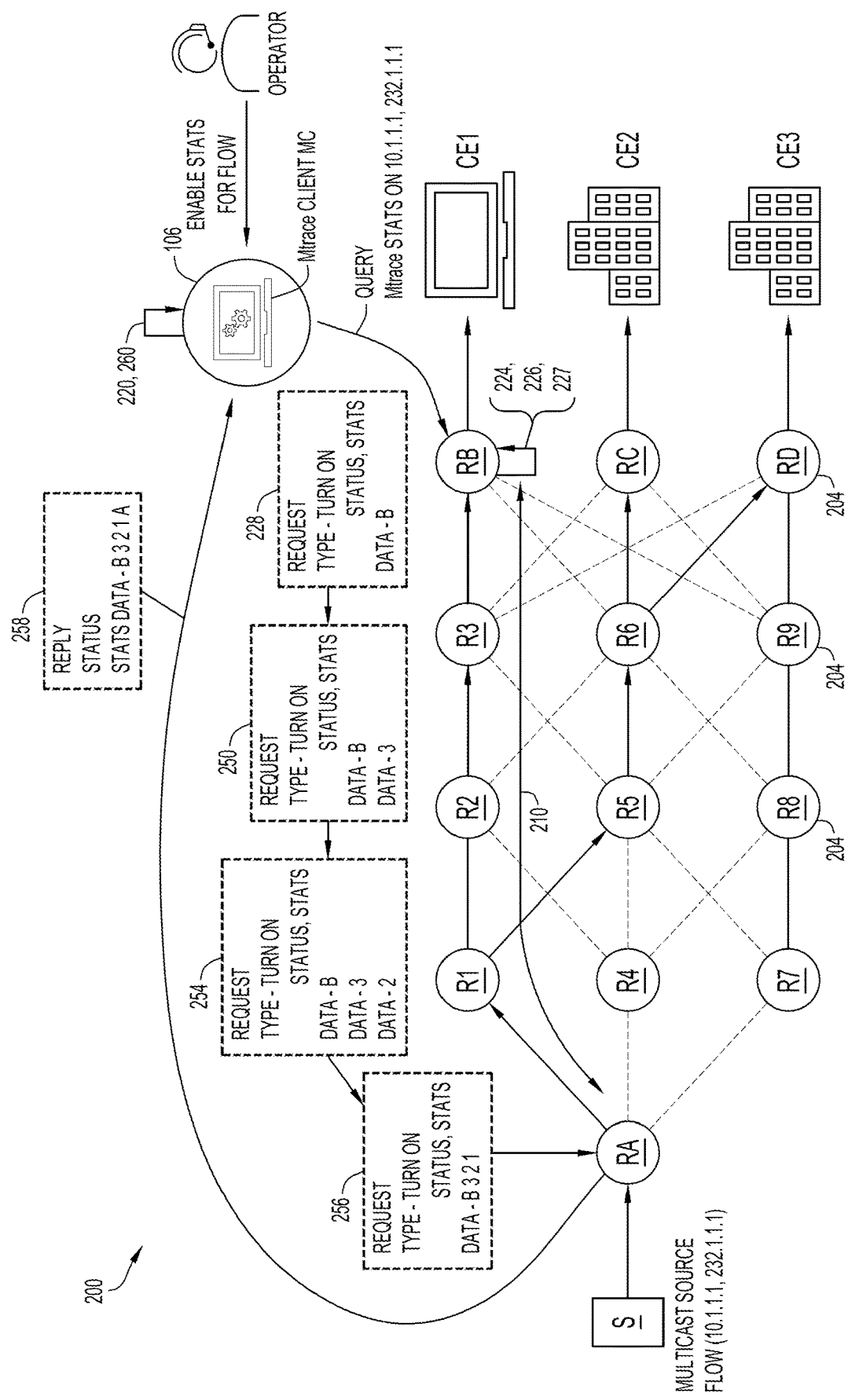
FIG. 2 is a block diagram of a multicast network of the network environment and in which controlling statistics tracing may be implemented, according to an example embodiment.

With reference to FIG. 2, there is a block diagram of an example multicast network 200 that may be implemented across access networks 102 and SP network 104. FIG. 2 is useful for describing control of statistics tracing of a multicast flow according to the embodiments presented herein. In the example of FIG. 2, multicast network 200 has a tree topology, although other topologies are possible. Multicast network 200 includes routers RA-RD and R1-R9 (collectively referred to as routers 204) connected to each other over various network links, as shown. More generally, routers 204 represent network devices or nodes, such as routers, switches, and the like, that may be implemented in hardware or virtually, e.g., as network device applications hosted on servers. Routers 204 are configured for routing/forwarding of multicast flows, and may be referred to as "multicast routers." A source S of multicast traffic is connected to router RA, and enterprise/customer equipment (or multicast receivers of multicast traffic) CE1-CE3 are connected to routers RB-RD, respectively. Source S and multicast receivers CE1-CE3 represent external equipment, such as user equipment or client devices connected to access networks 102, described above.

A multicast flow is identified by a pair or tuple (source address (S), group address (G)), which forms an identifier (ID) of the multicast flow. Generally, source S originates multicast flows of IP multicast packets destined for receivers CE1-CE3, and sends the multicast flows to router RA, also referred to as first hop router (FHR) RA. Acting as a source or ingress router for multicast network 200, router RA forwards the multicast flows to one or more of routers RB-RD in a downstream direction based on the identifiers (S, G) of the multicast flows. Routers RB, RC, and RD act as egress routers for the network to forward the multicast flows to receivers CE1, CE3, and CE2, respectively. Thus, routers RB-RD may each be referred to as a last hop router (LHR). Routers R1-R9 are transit or intermediate routers that are neither ingress routers (i.e., FHRs) nor egress routers (i.e., LHRs). In the example of FIG. 2, multicast source S originates an individual multicast flow (10.1.1.1, 232.1.1.1) that traverses a multicast path 210 from multicast source S to receiver CE1. Multicast path 210 includes a sequence of hops including routers RA (the FHR), R1, R2, R3, and RB (the LHR) that comprise a branch of the tree topology. Other multicast flows may traverse other multicast paths along branches of the topology from multicast source S to receivers CE1-CE3.

Routers 204 include per-router (i.e., local) resources for tracing/collecting statistics for multicast flows traversing the routers. For a given router, the resources may include counters and/or registers (which may be implemented in hardware and/or software) to count multicast packets forwarded by the router. For example, the counters count numbers of multicast input packets on incoming (i.e., ingress) interfaces/ports, numbers of multicast packets on outgoing (i.e., egress) interfaces/ports, and total numbers of multicast packets traversing the router for different multicast flows (e.g., (S, G) pairs). The counters also include timers to record various times for packets traversing the router. When the router is commanded to perform statistics tracing for a multicast flow, the router configures its (local) resources (e.g., resets the counters, assigns/associates the counters to the multicast path flow, and enables the counters to count) to perform the statistics tracing (e.g., to collect local statistics) for the multicast flows. The collected statistics may include the aforementioned numbers of packets tracked by the counters, for example.

At any given time, a router may have sufficient resources available to trace all of the multicast flows forwarded by the router. For example, the numbers of the various counters may be large enough to trace all of the multicast flow. Alternatively, the router may have insufficient resources available to trace all of the multicast flows. For example, the number of multicast flows may exceed the numbers of the various counters used to trace statistics. Accordingly, controller 106 and routers 204 each implement components/functions of Mtrace 110 to control statistics tracing for multicast flows traversing multicast network 200 individually, i.e., on a per-flow basis, and provide feedback status into whether the routers tasked with the statistics tracing have sufficient resources to perform the same.

Example operations performed by Mtrace 110 to perform statistics tracing for individual multicast flow (10.1.1.1, 232.1.1.1) on multicast path 210 are now described with continued reference to FIG. 2. A network operator executes an Mtrace client MC of Mtrace 110 on controller 106 (e.g., the controller instantiates the Mtrace client MC), and provides operator instructions to the Mtrace client MC. The Mtrace client MC receives an instruction from the network operator to enable a multicast trace (e.g., enable statistics tracing) of individual multicast flow (10.1.1.1, 232.1.1.1), and initiates the statistics tracing. To initiate the statistics tracing, at 220, the Mtrace client MC creates an Mtrace query packet (or "query") that includes a command to turn ON statistics tracing (i.e., a "turn ON command") specifically, and only, for multicast flow (10.1.1.1, 232.1.1.1). The query includes the turn ON command, the identifier of the multicast flow (10.1.1.1, 232.1.1.1) to which the turn ON command pertains, and the address of the Mtrace client MC. The Mtrace client MC sends the query to router RB, which is the LHR on multicast path 210.

Upon receiving the query, at 224, router RB parses the fields of the query to discover its contents. Router RB also turns the query into a request. The request enables upstream routers (from the perspective of the downstream direction of the multicast flow) that receive the request to add or append their own data (referred to as "response blocks") to the request. Thus, the request is configured to propagate along multicast path 210 in the upstream direction collecting multicast flow statistics and status at each hop along the way, i.e., from each router participating in the multicast path (e.g., the multicast branch), as described below. The request retains the turn ON command and the identifier of the multicast flow to which the turn ON command pertains at each hop. Responsive to the turn ON command in the query, router RB determines whether the router has sufficient resources (e.g., counters) to perform statistics tracing for the multicast flow. In the example of FIG. 2, all routers RB, R3, R2, R1, and RA of multicast path 210 have sufficient resources available to perform statistics tracing, although one or more of the routers may not have sufficient resources in other examples.

When the resources are sufficient to perform the statistics tracing, at 226, router RB performs the following "statistics tracing enabled" operations. Router RB turns ON statistics tracing for the multicast flow. To turn ON statistics tracing, router RB configures its multicast statistics tracing resources (e.g., counters) to collect statistics for the identified multicast flow. Then, the statistics tracing collects statistics for the multicast flow as packets of the multicast flow traverse the router. Router RB creates/generates a response block. The response block includes a hop count, an address of router RB, a status of statistics tracing in the router, and statistics "Data-B" collected by statistics tracing. In this case, the status of statistics tracing indicates that statistics tracing is actually turned ON (because the resources are sufficient). Router RB appends or adds the response block to the request to produce an updated or next request (referred to as a "first request") 228. For example, Router RB copies the request and adds the response block to the copied request, to produce first request 228. Router RB forwards first request 228 to upstream router R3, as shown in FIG. 2. Router R3 is considered upstream from router RB because the multicast flow traverses the routers in the downstream direction RA→R1→R2→R3→RB.

In the alternative, when the resources are insufficient, at 227, router RB performs the following alternative "statistics tracing disabled" operations. Router RB does not turn ON statistics tracing for the multicast flow, and therefore does not collect statistics for the multicast flow. Router RB determines or specifically identifies the insufficient resources (e.g., no available counters), and generates an alternative response block. The alternative response block includes the hop count, the address of router RB, and the status of statistics tracing, but no statistics. In this alternative case, the status of statistic tracing indicates (i) that statistics tracing is actually turned OFF, and (ii) identifiers for the insufficient resources, e.g., a reason that statistics tracing is turned OFF. The statistics in the response block are null (i.e., Data-B is absent). Router RB adds the alternative response block to the request, to produce an alternative updated request (not shown in FIG. 2) and sends the alternative updated request as the next request to upstream router R3.

Upon receiving first request 228 from router RB, router R3 handles the first request essentially the same way that router RB handled the query from the Mtrace client MC. That is, router R3 repeats operations 224-227 performed by router RB described above based on the turn ON command, the identifier of the multicast flow to which the turn ON command pertains, and the availability of resources to perform the statistics tracing. Thus, when router R3 has sufficient resources to perform statistics tracing for the multicast flow (which is the example shown in FIG. 2), the router turns ON statistics tracing and collects statistics for the multicast flow. Similar to router RB, router R3 generates a resource block, as described above, to include the hop count, address of router R3, status to indicate that statistics tracing is turned ON, and the statistics Data-3 collected by statistics tracing. Router R3 adds the resource block to first request 228 (which retains the turn ON command, the identifier of the multicast flow, and the address of the Mtrace client MC) to produce a next request (or "second request") 250 and forwards the same to the next upstream router R2, as shown in FIG. 2.

Alternatively, when router R3 has insufficient resources, the router does not turn ON statistics tracing. Router R3 generates an alternative resource block to include the hop count, the address of router R3, status to indicate that statistics tracing is turned OFF, a reason why the statistics tracing is turned OFF, and no statistics. Router RB adds the alterative resource block to first request 228, to produce the next request, and forwards the same to the next upstream router R2.

Each upstream router repeats the above-described operations to pass the requests (e.g., first request, second request, and so on) from router to router along multicast path 210 in the upstream direction until router RA is reached. The turn ON command originated by Mtrace client MC is retained in each request. The turn ON command attempts to turn ON statistics tracing for the multicast flow at each router. As the requests propagate along multicast path 210, the requests collect statistics (if any) and the statuses of the routers on the multicast path. For example, upon receiving second request 250, router R2 generates third request 254 to also include statistics Data-2 and the "turned ON" status for the router, and forwards the third request to router R1. Upon receiving third request 254, router R1 generates fourth request 256 to also include Data-1 and the "turned ON" status for the router, and forwards the same to router RA. Upon receiving fourth request 256, router RA generates a fifth request as describe above, converts the fifth request to a reply 258 to the initial query originated by Mtrace client MC, and forwards the reply to the Mtrace client.

The reply includes statistics Data-B, 3, 2, 1, A added by each router on multicast path 210 that has sufficient resources available to perform statistics tracing for the multicast flow. The reply also includes a list of router statuses to indicate whether each router along multicast path 210 has statistic tracing turned ON or turned OFF and, if turned OFF, a reason for the statistics tracing being turned OFF. In the example of FIG. 2, all of the routers on multicast path 210 have sufficient resources to perform statistics tracing, and the statuses reflect the same. In other examples, one or more of the routers may have insufficient resources to perform statistics tracing, and the statuses will reflect the same.

The Mtrace client MC receives the reply. At 260, the Mtrace client MC examines the router statuses in the reply and takes an action depending on whether the statuses indicate that one or more of the routers have statistics tracing turned OFF (but which should be turned ON). For example, the Mtrace client MC may resend the query to repeat the process described above.

Figure 3:
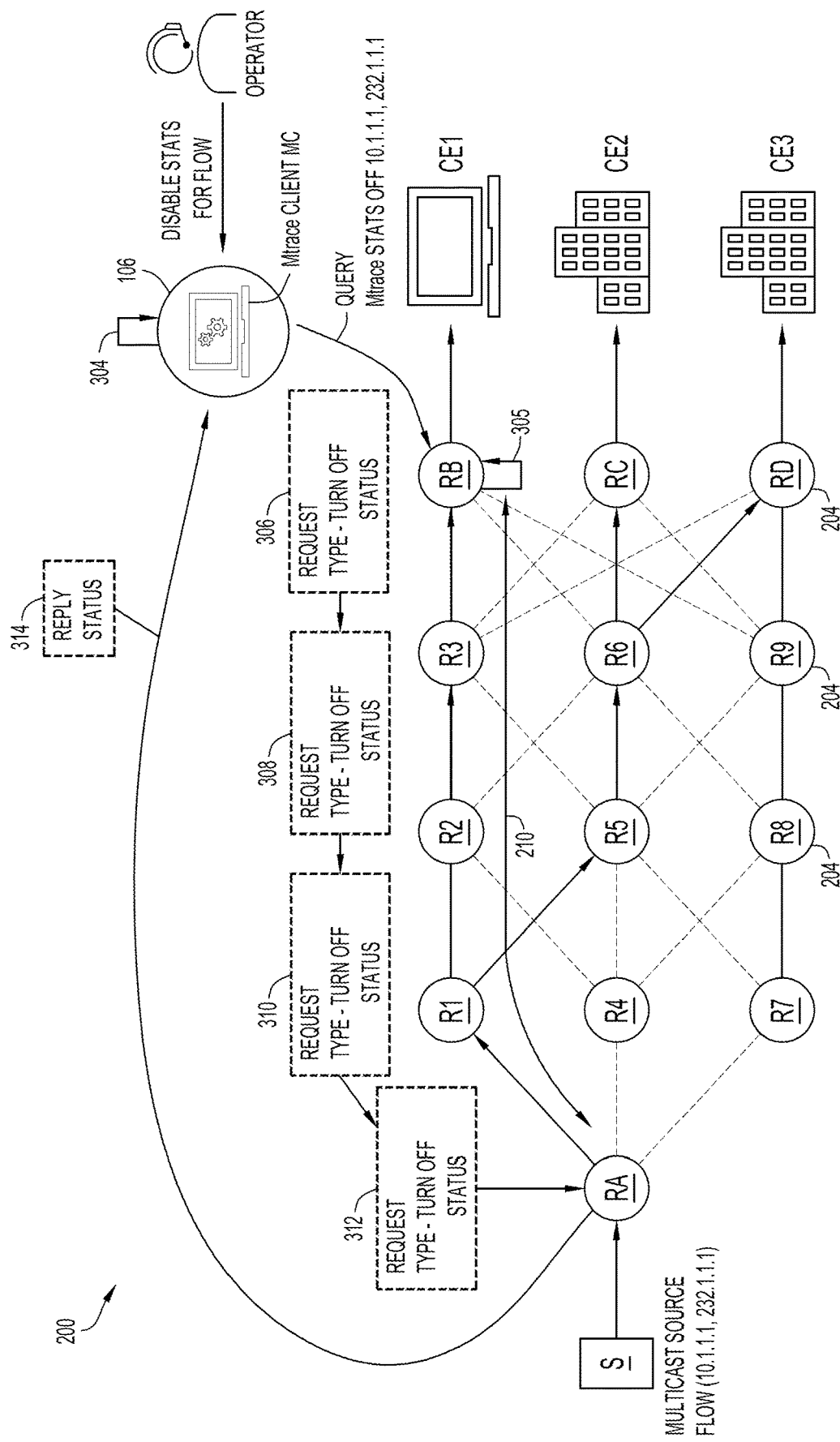
FIG. 3 is an illustration of operations performed in the multicast network responsive to a command to disable statistics tracing, according to an example embodiment.

In another example, after the Mtrace client MC has turned ON statistics tracing for the multicast flow as described above, the Mtrace client MC may receive an instruction from the operator to disable statistics tracing for the individual multicast flow, as shown in FIG. 3. FIG. 3 is an illustration of operations performed in multicast network 200 in connection with the disable instruction received from the operator. Responsive to the disable instruction, at 304, the Mtrace client MC generates an Mtrace query that includes a command to turn OFF multicast statistics tracing (i.e., a "turn OFF command") for the multicast flow. More specifically, the query includes the turn OFF command, the identifier of the multicast flow to which the turn OFF command pertains, and the address of the Mtrace client MC. The Mtrace client MC sends the query to router RB. Similar to the operations described above, router RB converts the query to a request that retains the contents of the query. As described below, the request is configured to be propagated along multicast path 210 turning off multicast tracing of the multicast flow at each hop along the way.

Responsive to the turn OFF command, at 305, router RB turns OFF statistics tracing for the multicast flow, i.e., configures resources not to trace statistics for the multicast flow. Router RB may populate the request with status to indicate that statistics tracing is turned OFF, and forwards the request as updated, as request 306, to upstream router R3. Routers R3, R2, and R1 repeat the aforementioned "turn OFF" operations 305 to generate successive "turn OFF" requests 308, 310, and 312 that propagate along multicast path 210 in the upstream direction to turn OFF statistics tracing in each of the routers along the way. Upon receiving request 312, router RA turns OFF statistics tracing, converts the request to a reply 314, adds the "turned OFF" status to the reply, and forwards the reply to the Mtrace client MC. Reply 314 includes the turn OFF status added by each of the routers. Upon receiving reply 314, the Mtrace client MC confirms that all of the routers have turned OFF statistics tracing.

In embodiments where controller 106 may not be available to originate queries that carry the initial turn ON and turn OFF commands, one of routers 204 may originate the initial turn ON and or turn OFF commands in corresponding initial requests.

Figure 4:
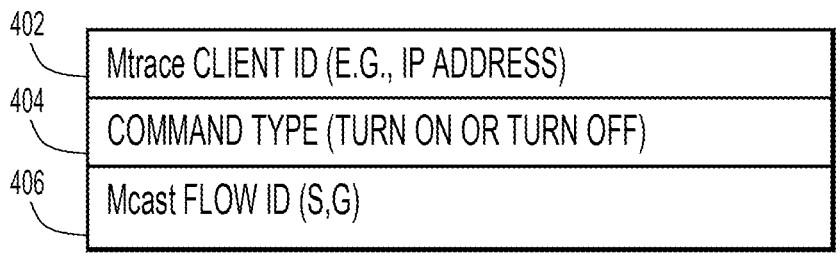
FIG. 4 is an illustration of a query sent by an Mtrace client, according to an example embodiment.

FIG. 4 is an illustration of a query 400 sent by the Mtrace client MC, according to an embodiment. Query 400 includes Mtrace client MC ID 402, command type 404 (either turn ON or turn OFF statistics tracing), and multicast flow ID 406. The command type may be a one-bit or a multibit field encoded with a first value for turn ON and a second value for turn OFF.

Figure 5:
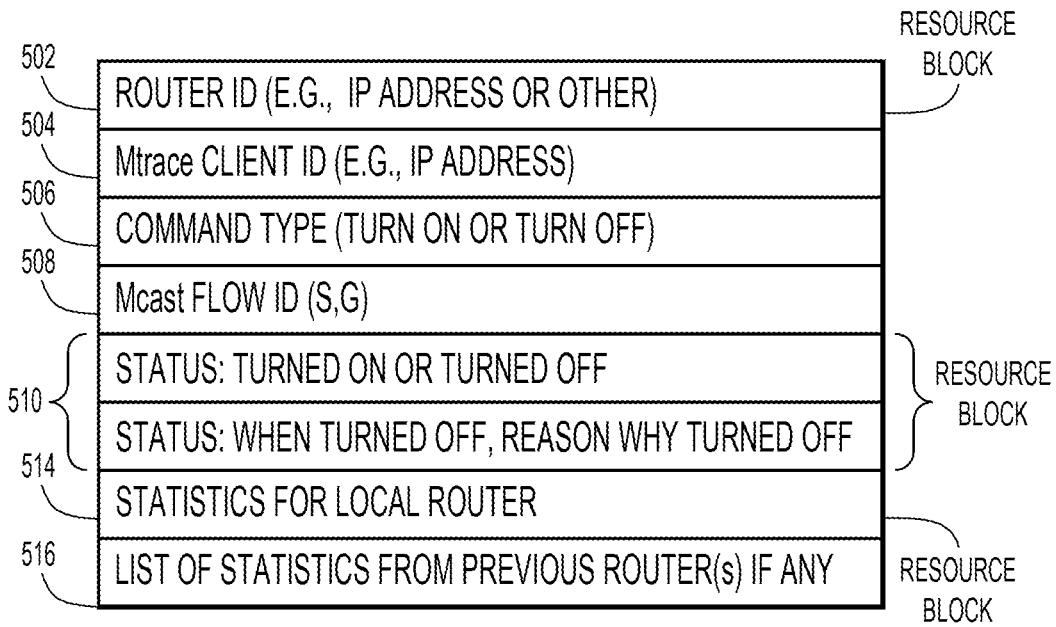
FIG. 5 is an illustration of a request sent by a router, according to an example embodiment.

FIG. 5 is an illustration of a request 500 sent by routers 204, according to an embodiment. Reply 258 and reply 314 may each include fields similar to request 500. Request 500 includes router ID 502, Mtrace client MC ID 504, command type 506 (e.g., turn ON or turn OFF), multicast flow ID 508, and status 510. Status 510 includes a first value or a second value to indicate that statistics tracing is turned ON or OFF, respectively. When turned OFF, status 510 further includes a multibit field encoded with one or more values to indicate one or more reasons why statistics tracing is turned OFF, e.g., statistics tracing is turned OFF responsive to a turn OFF command, or because resources are insufficient/exhausted. When resources are exhausted, status 510 further indicates/identifies the exhausted resource(s), e.g., counters are exhausted, timers are exhausted, and so on. Request 500 further includes statistics 514, if any, collected by the local router. Request 500 may also include a hop count. Request 500 also includes statistics 516 and statuses append to the request by previous routers. Router ID 502, status 510, and statistics 514 collectively form a resource block appended by the local router, although the resource block may include more or less of the fields.

Figure 6:
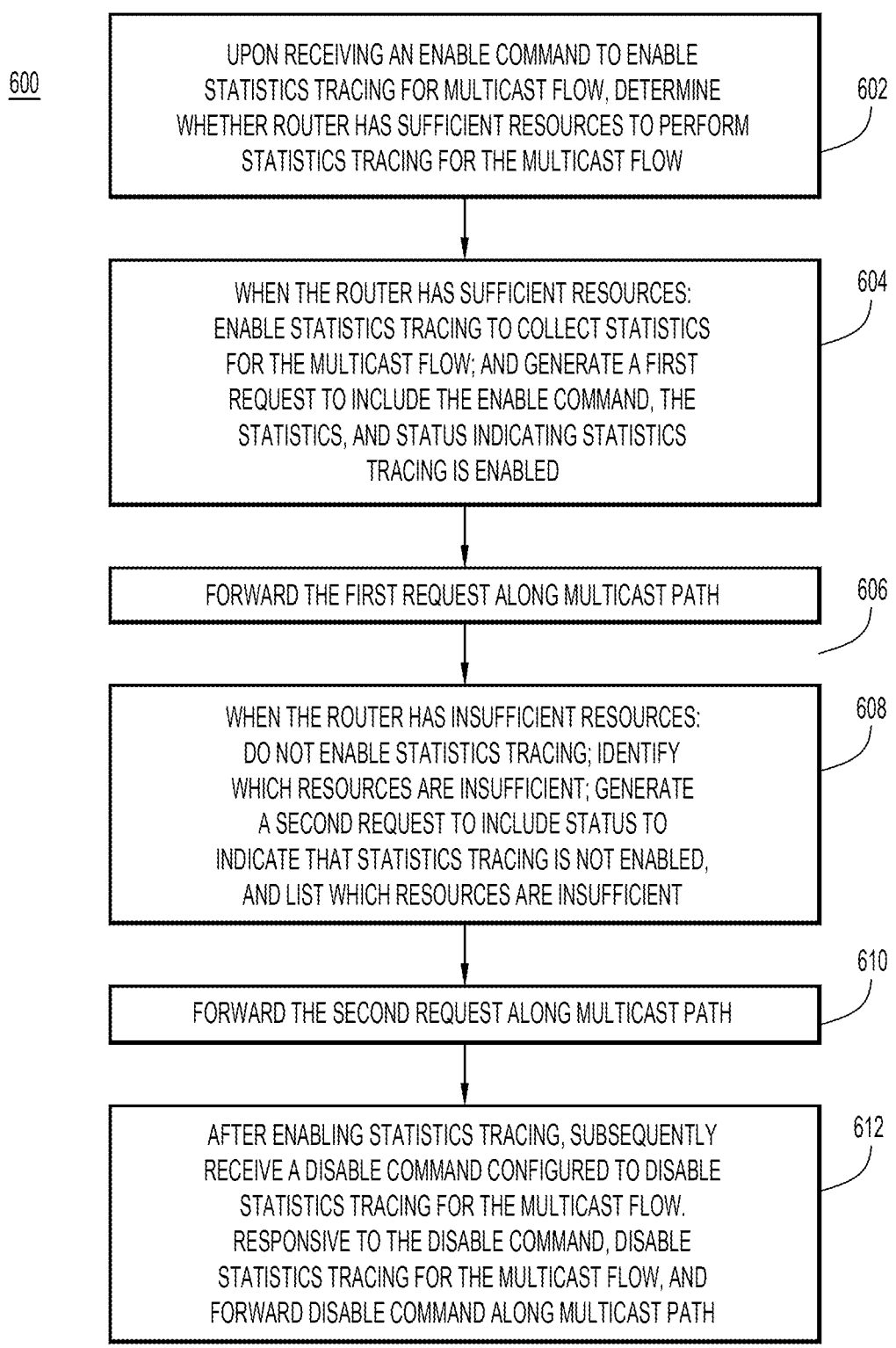
FIG. 6 is a flowchart of a method of controlling and performing statistics tracing of a multicast flow performed by a router, according to an example embodiment.

FIG. 6 is a flowchart of an example method 600 of controlling and performing statistics tracing (i.e., a multicast trace) of a multicast flow performed by a router on a multicast path having routers that forward the multicast flow in a downstream direction, for example. Operations of method 600 are described above. As used herein, the terms "enable," "enabled," and "enabling" used in connection with statistics tracing are synonymous and interchangeable with the terms "turn ON," "turned ON," and "turning ON," respectively. Similarly, the terms "disable," "disabled," and "disabling" used in connection with statistics tracing are synonymous and interchangeable with the terms "turn OFF," "turned OFF," and "turning OFF," respectively.

At 602, the router receives an enable (i.e., turn ON) command configured to enable statistics tracing for the multicast flow, individually. The router may receive the enable command in a query directly from a controller connected to the multicast path, or in a request forwarded by another router (e.g., a downstream router) on the multicast path. Upon receiving the enable command, the router determines whether the router has sufficient resources (e.g., packet counters) to perform statistics tracing for the multicast flow.

When the router has sufficient resources (e.g., counters are available for statistics tracing), responsive to the enable command, at 604, the router performs the following "statistics tracing enabled" operations. The router generates a first request to include (i) the enable command, (ii) the router address, (iii) the statistics that are collected, and optionally (iv) status to indicate that statistics tracing is enabled for the multicast flow.

At 606, the router forwards the first request towards the controller. When the router is a last hop router that received the enable command directly from the controller, or when the router is a transit router, the router forwards the first request to an upstream router along the multicast path towards a first hop router. When the router is the first hop router that received the enable command in a request from a downstream router, the router forwards the first request directly to the controller in the form of a reply (in response to an initial query sent by the controller).

When the router has insufficient resources (e.g., counters are not available for statistics tracing), responsive to the enable command, at 608, the router performs the following "statistics tracing disabled" operations. The router generates a second or alternative request to include (i) the enable command, (ii) the router address, and (iii) status to indicate that statistics tracing is disabled for the multicast flow.

At 610, the router forwards the second request towards the controller, in the same manner the router would have forwarded the first request had there been sufficient resources.

After enabling and performing statistics tracing, at 612, the router subsequently receives a disable (i.e., turn OFF) command configured to disable statistics tracing for the multicast flow. Responsive to the disable command, the router disables statistics tracing for the multicast flow, and forwards the disable command along the multicast path in the upstream direction towards the first hop router to disable statistics tracing of the multicast flow at each router along the way.

Figure 7:
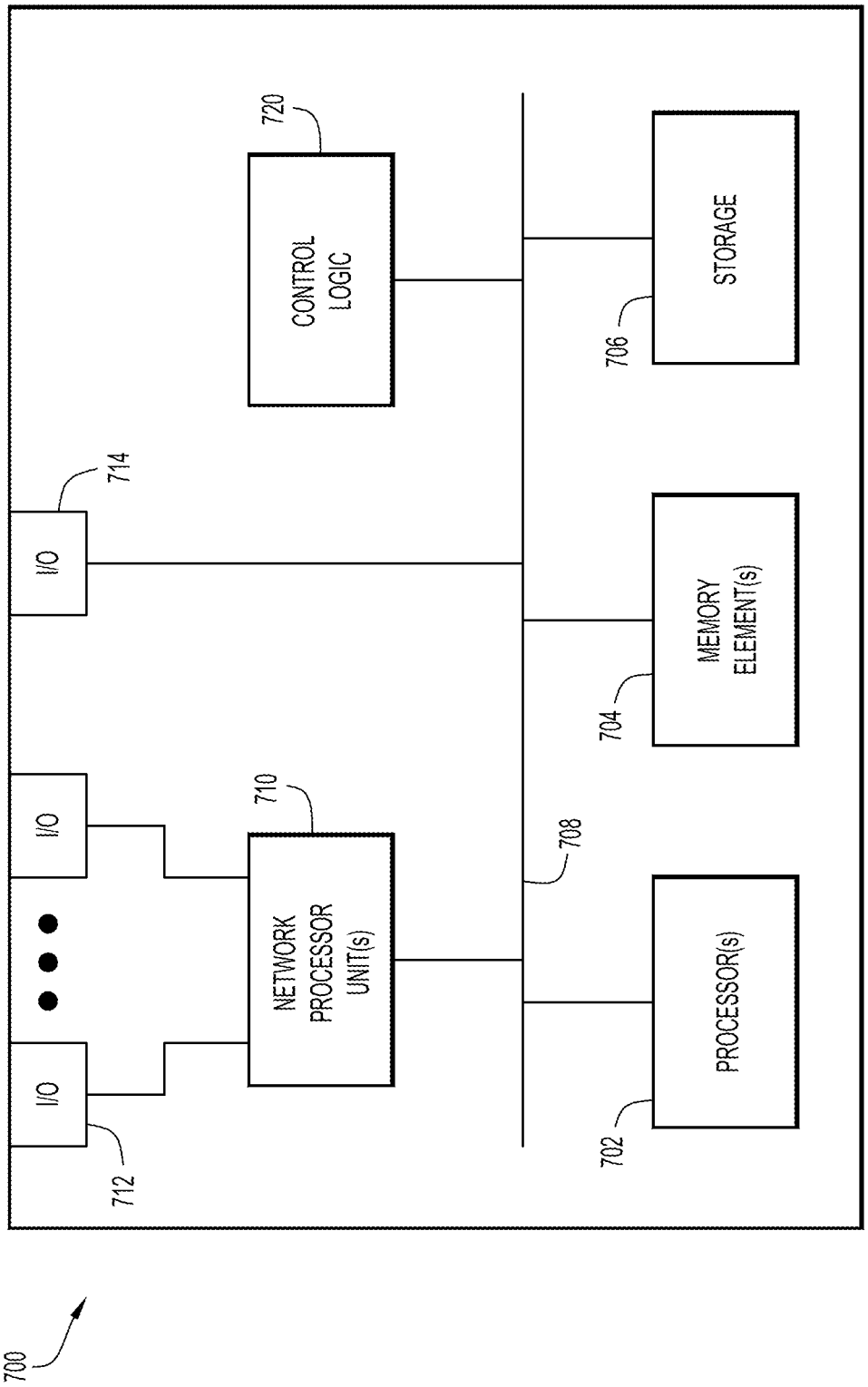
FIG. 7 is a hardware block diagram of a computing device that may perform functions associated with operations performed in connection embodiments presented herein, according to an embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any entity/entities as discussed for the techniques depicted in connection with FIGS. 1-6 in order to perform operations of the various techniques discussed herein. Computing device 700 may represent each of the routers and the controller described above.

In at least one embodiment, the computing device 700 may be any apparatus that may include one or more processor(s) 702, one or more memory element(s) 704, storage 706, a bus 708, one or more network processor unit(s) 710 interconnected with/coupled to one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, in some aspects, the techniques described herein relate to a method performed by a router on a multicast path configured to forward a multicast flow, the method including: upon receiving, from a controller connected to the multicast path or from the multicast path, an enable command to enable statistics tracing for the multicast flow, determining whether the router has sufficient resources to perform statistics tracing; and when the router has the sufficient resources: responsive to the enable command, enabling statistics tracing to collect statistics for the multicast flow; generating a first request to include the enable command and the statistics; and forwarding the first request towards the controller.

In some aspects, the techniques described herein relate to a method, wherein: generating the first request includes generating the first request to include status to indicate that statistics tracing is enabled.

In some aspects, the techniques described herein relate to a method, further including at the router, when the router has insufficient resources: not enabling statistics tracing for the multicast flow; generating a second request to include status to indicate that statistics tracing is not enabled; and forwarding the second request towards the controller.

In some aspects, the techniques described herein relate to a method, further including, at the router: when the router has the insufficient resources, identifying the insufficient resources, wherein generating the second request includes generating the second request to identify the insufficient resources.

In some aspects, the techniques described herein relate to a method, wherein: the router include counters to count multicast packets traversing the router; and determining the insufficient resources includes determining that the counters are not available for statistics tracing.

In some aspects, the techniques described herein relate to a method, further including, at the router: after enabling statistics tracing, receiving a disable command configured to disable statistics tracing for the multicast flow; and responsive to the disable command, disabling statistics tracing for the multicast flow.

In some aspects, the techniques described herein relate to a method, wherein: the router includes counters to count multicast packets traversing the router; and determining the sufficient resources includes determining that the counters are available for statistics tracing.

In some aspects, the techniques described herein relate to a method, wherein: receiving includes receiving the enable command in a query directly from the controller; and forwarding the first request includes forwarding the first request to an upstream router on the multicast path.

In some aspects, the techniques described herein relate to a method, wherein: receiving includes receiving the enable command in a request forwarded by a downstream router on the multicast path; and forwarding the first request includes forwarding the first request to an upstream router or the controller.

In some aspects, the techniques described herein relate to an apparatus including: a network input/output interface to communicate with a network; and a processor of a router on a multicast path configured to forward a multicast flow, the processor coupled to the network input/output interface and configured to perform: upon receiving, from a controller connected to the multicast path or from the multicast path, an enable command to enable statistics tracing for the multicast flow, determining whether the router has sufficient resources to perform statistics tracing; and when the router has the sufficient resources: responsive to the enable command, enabling statistics tracing to collect statistics for the multicast flow; generating a first request to include the enable command and the statistics; and forwarding the first request towards the controller.

In some aspects, the techniques described herein relate to an apparatus, wherein: the processor is configured to perform generating the first request by generating the first request to include status to indicate that statistics tracing is enabled.

In some aspects, the techniques described herein relate to an apparatus, wherein the processor is further configured to perform, when the router has insufficient resources: not enabling statistics tracing for the multicast flow; generating a second request to include status to indicate that statistics tracing is not enabled; and forwarding the second request towards the controller.

In some aspects, the techniques described herein relate to an apparatus, wherein the processor is further configured to perform: when the router has the insufficient resources, identifying the insufficient resources, wherein generating the second request includes generating the second request to identify the insufficient resources.

In some aspects, the techniques described herein relate to an apparatus, wherein: the router include counters to count multicast packets traversing the router; and the processor is configured to perform determining the insufficient resources by determining that the counters are not available for statistics tracing.

In some aspects, the techniques described herein relate to an apparatus, wherein the processor is further configured to perform: after enabling statistics tracing, receiving a disable command configured to disable statistics tracing for the multicast flow; and responsive to the disable command, disabling statistics tracing for the multicast flow.

In some aspects, the techniques described herein relate to an apparatus, wherein: the router includes counters to count multicast packets traversing the router; and the processor is configured to perform determining the sufficient resources by determining that the counters are available for statistics tracing.

In some aspects, the techniques described herein relate to an apparatus, wherein: the processor is configured to perform receiving by receiving the enable command in a query directly from the controller; and the processor is configured to perform forwarding the first request by forwarding the first request to an upstream router on the multicast path.

In some aspects, the techniques described herein relate to a non-transitory computer medium encoded with instructions that, when executed by a processor of a router on a multicast path configured to forward a multicast flow, cause the processor to perform: upon receiving, from a controller connected to the multicast path or from the multicast path, an enable command to enable statistics tracing for the multicast flow, determining whether the router has sufficient resources to perform statistics tracing; and when the router has the sufficient resources: responsive to the enable command, enabling statistics tracing to collect statistics for the multicast flow; generating a first request to include the enable command and the statistics; and forwarding the first request towards the controller.

[ow] In some aspects, the techniques described herein relate to a non-transitory computer medium, wherein: the instructions to cause the processor to perform generating the first request include instructions to cause the processor to perform generating the first request to include status to indicate that statistics tracing is enabled.

In some aspects, the techniques described herein relate to a non-transitory computer medium, further including instructions to cause the processor to perform, when the router has insufficient resources: not enabling statistics tracing for the multicast flow; generating a second request to include status to indicate that statistics tracing is not enabled; and forwarding the second request towards the controller.

In another aspect, a method comprises: at a controller connected to a multicast path of routers configured to forward a multicast flow along the multicast path in a downstream direction: generating a query having an enable command configured to enable statistics tracing for the multicast flow, and sending the enable command to the routers of the multicast path, the enable command further configured to cause the routers to propagate the enable command in the form of requests from router-to-router (i.e., hop-by-hop) in an upstream direction towards a first hop router (and back to the controller), enable statistics tracing in the routers to collect local statistics for the multicast flow at each router, and populate the requests with the local statistics and statuses that reflect whether the statistics tracing is turned ON or turned OFF in the routers.

In yet another aspect, a method comprises: at a controller connected to a multicast path of routers configured to forward a multicast flow along the multicast path in a downstream direction: generating a query having a disable command configured to disable statistics tracing for the multicast flow, and sending the disable command to the routers of the multicast path, the disable command further configured to cause the routers to propagate the disable command in the form of requests from router-to-router (i.e., hop-by-hop) in an upstream direction towards a first hop router (and back to the controller), disable statistics tracing in the routers for the multicast flow at each router, and populate the requests with statuses that reflect that the statistics tracing is turned OFF in the routers.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a router on a multicast path configured to forward a multicast flow, the method comprising:
   upon receiving, from a controller connected to the multicast path or from the multicast path, an enable command to enable statistics tracing for the multicast flow, determining whether the router has sufficient resources to perform statistics tracing;
   when the router has the sufficient resources:
      responsive to the enable command, enabling statistics tracing to collect statistics for the multicast flow;
      generating a first request to include the enable command and the statistics; and
      forwarding the first request towards the controller; and
   when the router has insufficient resources:
      not enabling statistics tracing for the multicast flow;
      generating a second request to include status to indicate that statistics tracing is not enabled; and
      forwarding the second request towards the controller.

2. The method of claim 1, wherein:
   generating the first request includes generating the first request to include status to indicate that statistics tracing is enabled.

3. The method of claim 1,
   the first request includes a multicast flow identifier.

4. The method of claim 1, further comprising, at the router:
   when the router has the insufficient resources, identifying the insufficient resources,
   wherein generating the second request includes generating the second request to identify the insufficient resources.

5. The method of claim 1, wherein:
   the router include counters to count multicast packets traversing the router; and
   determining the insufficient resources includes determining that the counters are not available for statistics tracing.

6. The method of claim 1, further comprising, at the router:
   after enabling statistics tracing, receiving a disable command configured to disable statistics tracing for the multicast flow; and
   responsive to the disable command, disabling statistics tracing for the multicast flow.

7. The method of claim 1, wherein:
   the router includes counters to count multicast packets traversing the router; and
   determining the sufficient resources includes determining that the counters are available for statistics tracing.

8. The method of claim 1, wherein:
   receiving includes receiving the enable command in a query directly from the controller; and
   forwarding the first request includes forwarding the first request to an upstream router on the multicast path.

9. The method of claim 1, wherein:
   receiving includes receiving the enable command in a request forwarded by a downstream router on the multicast path; and
   forwarding the first request includes forwarding the first request to an upstream router or the controller.

10. An apparatus comprising:
    a network input/output interface to communicate with a network; and a processor of a router on a multicast path configured to forward a multicast flow, the processor coupled to the network input/output interface and configured to perform:

upon receiving, from a controller connected to the multicast path or from the multicast path, an enable command to enable statistics tracing for the multicast flow, determining whether the router has sufficient resources to perform statistics tracing; and when the router has the sufficient resources:

responsive to the enable command, enabling statistics tracing to collect statistics for the multicast flow;

generating a first request to include the enable command and the statistics; and forwarding the first request with the enable command along the multicast path to cause each router along the multicast path to enable statistic tracing and collection responsive to the enable command as the enable command traverses the multicast path, router-by-router.

11. The apparatus of claim 10, wherein:
the processor is configured to perform generating the first request by generating the first request to include status to indicate that statistics tracing is enabled.

12. The apparatus of claim 10, wherein the processor is further configured to perform, when the router has insufficient resources:

not enabling statistics tracing for the multicast flow;
generating a second request to include status to indicate that statistics tracing is not enabled; and
forwarding the second request towards the controller.

13. The apparatus of claim 12, wherein the processor is further configured to perform:

when the router has the insufficient resources, identifying the insufficient resources,
wherein generating the second request includes generating the second request to identify the insufficient resources.

14. The apparatus of claim 12, wherein:
the router include counters to count multicast packets traversing the router; and
the processor is configured to perform determining the insufficient resources by determining that the counters are not available for statistics tracing.

15. The apparatus of claim 10, wherein the processor is further configured to perform:

after enabling statistics tracing, receiving a disable command configured to disable statistics tracing for the multicast flow; and
responsive to the disable command, disabling statistics tracing for the multicast flow.

16. The apparatus of claim 10, wherein:
the router includes counters to count multicast packets traversing the router; and
the processor is configured to perform determining the sufficient resources by determining that the counters are available for statistics tracing.

17. The apparatus of claim 10, wherein:
the processor is configured to perform receiving by receiving the enable command in a query directly from the controller.

18. A non-transitory computer medium encoded with instructions that, when executed by a processor of a router on a multicast path configured to forward a multicast flow, cause the processor to perform:

upon receiving, from a controller connected to the multicast path or from the multicast path, an enable command to enable statistics tracing for the multicast flow, determining whether the router has sufficient resources to perform statistics tracing;

when the router has the sufficient resources:
responsive to the enable command, enabling statistics tracing to collect statistics for the multicast flow;
generating a first request to include the enable command and the statistics; and
forwarding the first request towards the controller; and when the router has insufficient resources:
not enabling statistics tracing for the multicast flow;
generating a second request to include status to indicate that statistics tracing is not enabled; and
forwarding the second request towards the controller.

19. The non-transitory computer medium of claim 18, wherein:
the instructions to cause the processor to perform generating the first request include instructions to cause the processor to perform generating the first request to include status to indicate that statistics tracing is enabled.

20. The non-transitory computer medium of claim 18, wherein:
the first request includes a multicast flow identifier.

* * * * *